(12) United States Patent
Hetrick et al.

(10) Patent No.: US 8,364,809 B2
(45) Date of Patent: *Jan. 29, 2013

(54) METHOD AND APPARATUS FOR DEBUGGING PROTOCOL TRAFFIC BETWEEN DEVICES IN INTEGRATED SUBSYSTEMS

(75) Inventors: William A. Hetrick, Wichita, KS (US); Jeremy Dean Stover, Wichita, KS (US); Matt Tiemeyer, Bothell, WA (US)

(73) Assignee: Netapp, Inc., Sunnyvale, CA (US)

( * ) Notice: Subject to any disclaimer, the term of this patent is extended or adjusted under 35 U.S.C. 154(b) by 311 days.

This patent is subject to a terminal disclaimer.

(21) Appl. No.: 12/573,238

(22) Filed: Oct. 5, 2009

(65) Prior Publication Data

US 2010/0023591 A1   Jan. 28, 2010

Related U.S. Application Data

(62) Division of application No. 10/218,726, filed on Aug. 14, 2002, now Pat. No. 7,616,631.

(51) Int. Cl.
*G06F 15/173* (2006.01)
(52) U.S. Cl. .......................................... 709/224; 714/30
(58) Field of Classification Search .......... 709/212–216, 709/223–224, 229, 238, 245, 253, 200; 712/227, 712/32, 244; 714/3–5, 24–25, 30, 39, 42–44, 714/724, 733; 710/100, 72, 20
See application file for complete search history.

(56) References Cited

U.S. PATENT DOCUMENTS

| | | | |
|---|---|---|---|
| 5,633,999 A | 5/1997 | Clowes et al. | |
| 6,115,763 A * | 9/2000 | Douskey et al. | ................. 710/72 |
| 6,188,686 B1 | 2/2001 | Smith | |
| 6,343,324 B1 | 1/2002 | Hubis et al. | |
| 6,400,730 B1 | 6/2002 | Latif et al. | |
| 6,408,358 B1 * | 6/2002 | Uchiyama et al. | ............ 711/114 |
| 6,530,047 B1 * | 3/2003 | Edwards et al. | .............. 714/724 |
| 6,542,924 B1 * | 4/2003 | Abe | ............................. 709/208 |
| 6,708,302 B1 * | 3/2004 | Shibayama et al. | .......... 714/724 |
| 6,766,466 B1 | 7/2004 | Jibbe | |
| 6,785,742 B1 | 8/2004 | Teow et al. | |
| 6,834,311 B2 | 12/2004 | Rao | |
| 6,880,101 B2 | 4/2005 | Golasky et al. | |
| 6,961,767 B2 * | 11/2005 | Coffey et al. | ................. 709/224 |
| 7,139,277 B2 | 11/2006 | Ofek et al. | |
| 7,159,216 B2 | 1/2007 | McDonald | |
| 7,216,258 B2 | 5/2007 | Ebsen et al. | |
| 7,533,288 B2 | 5/2009 | Hatasaki et al. | |
| 7,548,975 B2 | 6/2009 | Kumar et al. | |
| 2002/0046276 A1 * | 4/2002 | Coffey et al. | ................. 709/224 |
| 2002/0103913 A1 | 8/2002 | Tawil et al. | |
| 2002/0161881 A1 * | 10/2002 | Perkinson et al. | ............ 709/224 |
| 2002/0169869 A1 * | 11/2002 | Fainer et al. | ................... 709/224 |
| 2002/0170004 A1 | 11/2002 | Parrett et al. | |
| 2003/0233601 A1 * | 12/2003 | Vaid et al. | ........................ 714/42 |
| 2004/0059806 A1 * | 3/2004 | Webb | ............................. 709/223 |
| 2005/0132040 A1 * | 6/2005 | Ellis et al. | ..................... 709/223 |

* cited by examiner

*Primary Examiner* — Greg C Bengzon
(74) *Attorney, Agent, or Firm* — Haynes and Boone, LLP

(57) ABSTRACT

A method, apparatus, and computer instructions for a storage subsystem. This subsystem includes controller devices, storage devices, and a communications network. The communications network connects the controller devices and the storage devices. The communications network also includes a set of diagnostic outputs. The set of diagnostic outputs is configured to output data sent between two devices from the controller devices and the storage devices for monitoring.

17 Claims, 5 Drawing Sheets

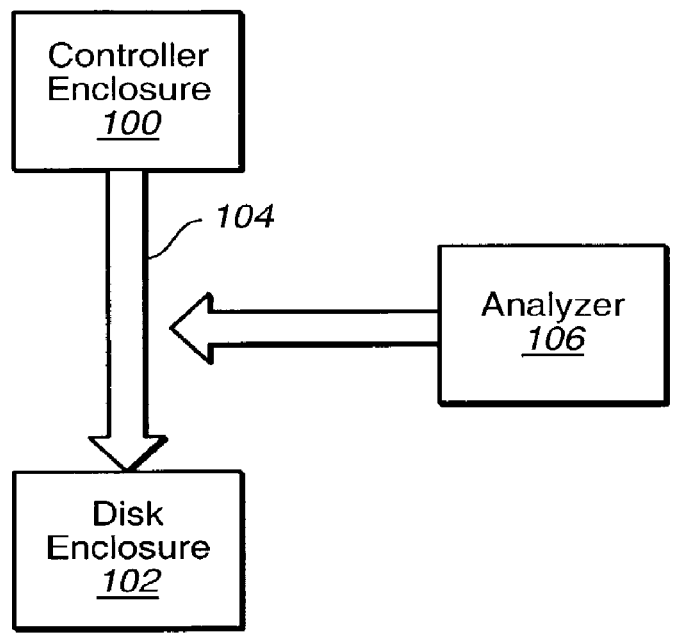
FIG._1
*(PRIOR ART)*
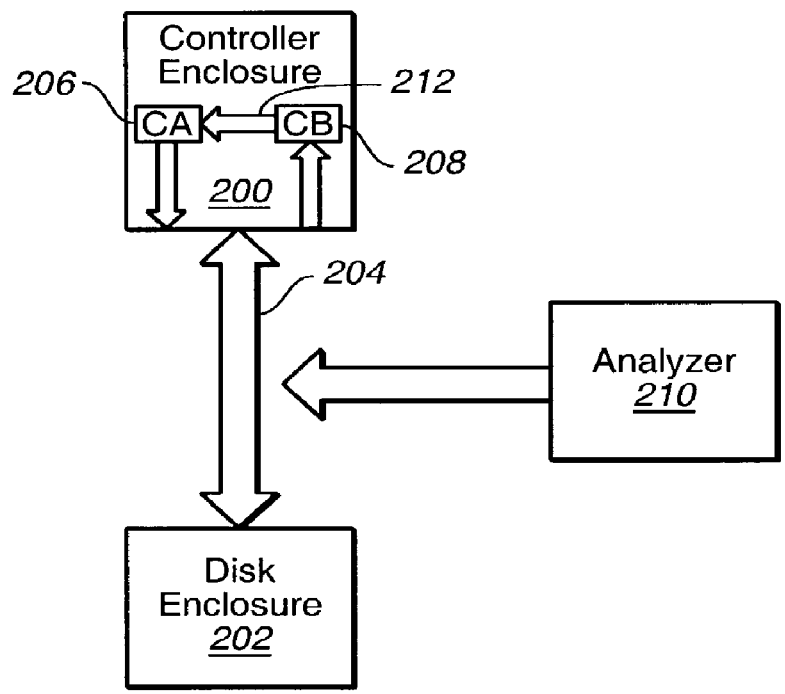
FIG._2
*(PRIOR ART)*

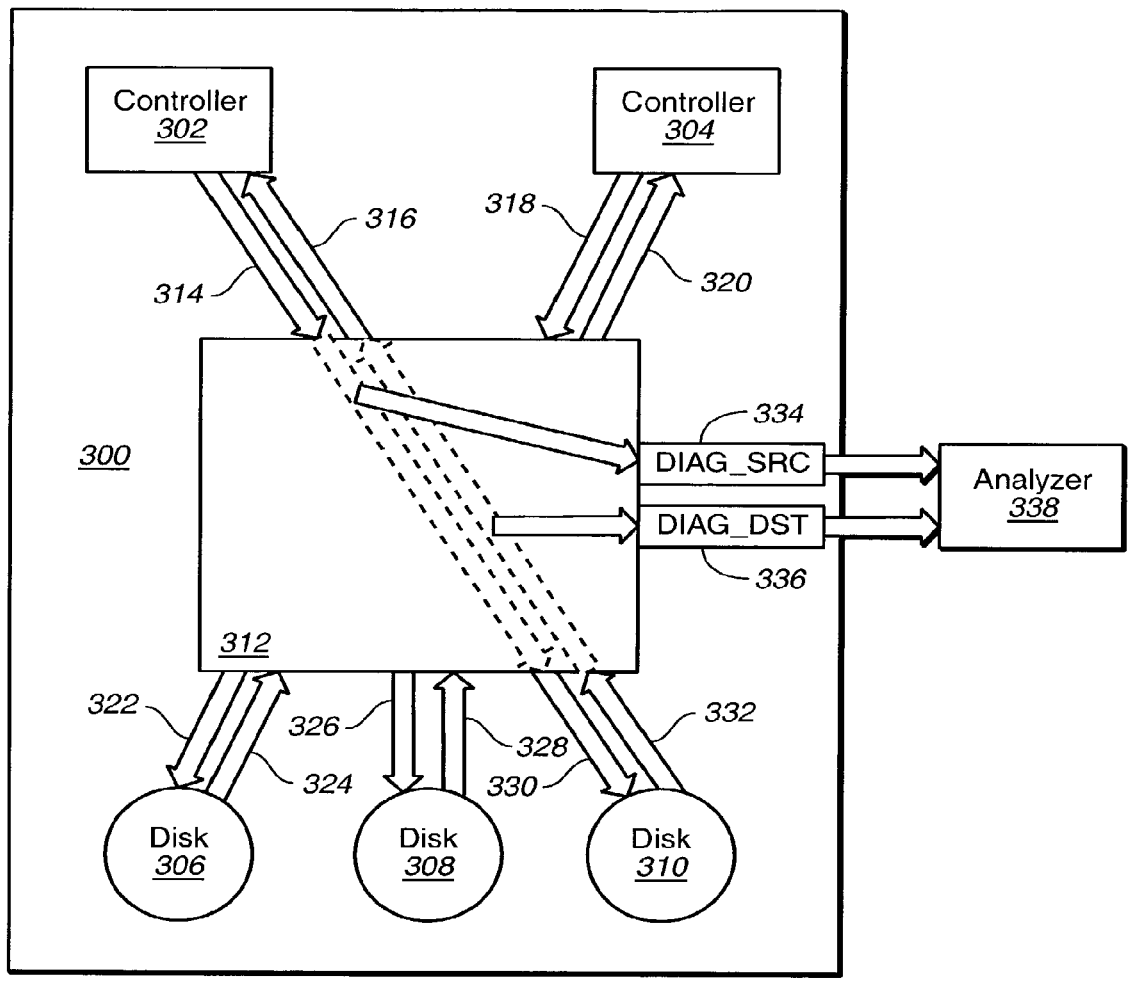
FIG._3

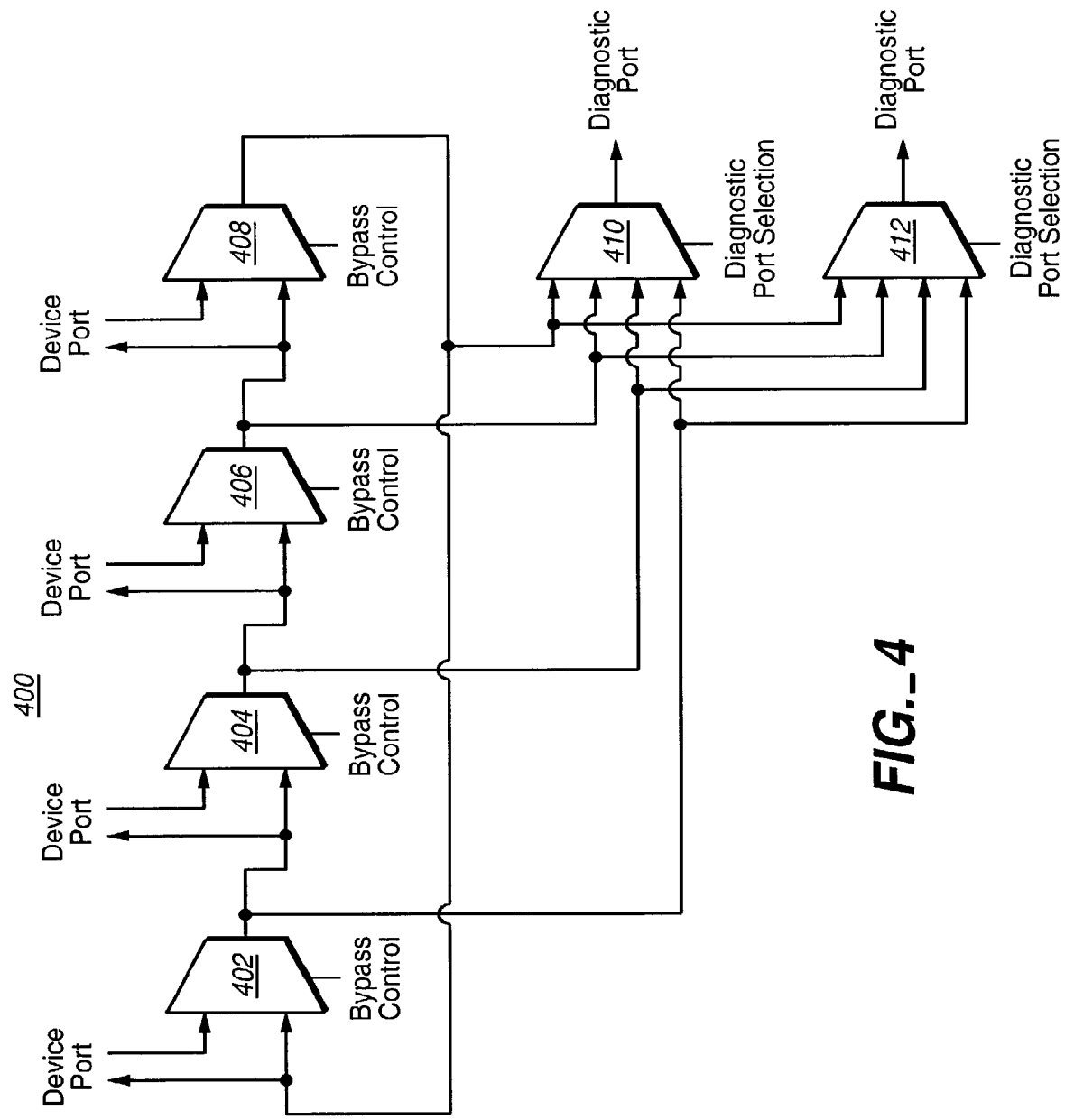
FIG._4

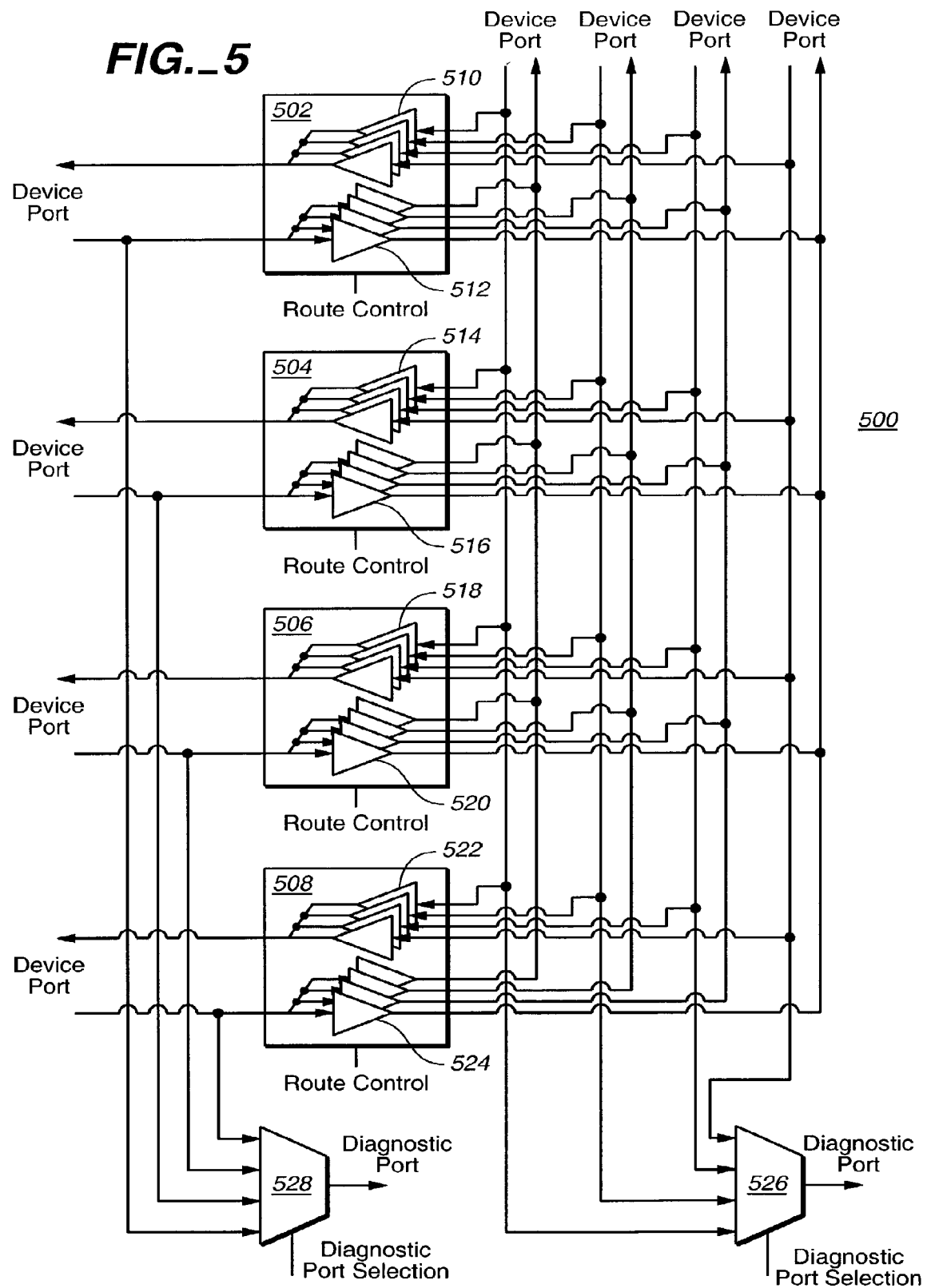

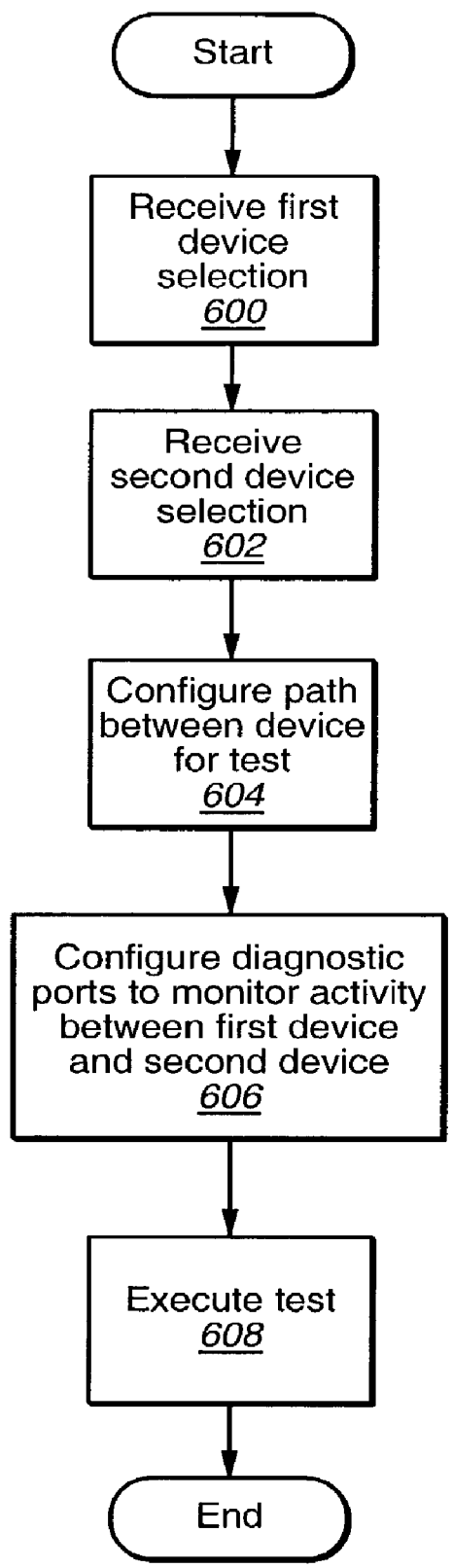
FIG._6

METHOD AND APPARATUS FOR DEBUGGING PROTOCOL TRAFFIC BETWEEN DEVICES IN INTEGRATED SUBSYSTEMS

This application is a divisional of application Ser. No. 10/218,726, filed Aug. 14, 2002, status allowed.

BACKGROUND OF THE INVENTION

1. Technical Field

The present invention is directed generally toward a method and apparatus for processing data. Still more particularly, the present invention provides a method, apparatus, and computer implemented instructions for debugging and performing diagnostic testing in a data processing system.

2. Description of the Related Art

Fibre channel is a high-speed transport technology used to build storage area networks (SANs). Fibre channel is a channel-network hybrid, containing sufficient network features to provide needed connectivity, distance, and protocol multiplexing, as well as sufficient traditional channel features to retain simplicity, repeatable performance, and guaranteed delivery. Although Fibre channel can be used as a general-purpose network carrying Asynchronous Transfer Mode (ATM), Internet Protocol (IP) and other protocols, this architecture has been primarily used for transporting Small Computer System Interface (SCSI) traffic from servers to disk arrays. The Fibre Channel Protocol (FCP) serializes SCSI commands into Fibre channel frames. IP, however, is used for in-band Simple Network Management Protocol (SNMP) network management. Fibre channel not only supports singlemode and multimode fiber connections, but coaxial cable and twisted pair as well.

Fibre channel can be configured point-to-point, via a switched topology or in an arbitrated loop (FC-AL) with or without a hub. Fibre channel provides both connection-oriented and connectionless services. With respect to the use of fibre channel in storage subsystem environments, such as those contained in disk arrays, debugging of these systems is currently formed by connecting an analyzer to extract traffic moving between devices for examination. For example, FIG. 1 is a diagram of a known controller/storage device system employing fibre channel. Controller enclosure 100 is connected to disk enclosure 102 through fibre channel connection 104. In this example, disk enclosure 102 is external to controller enclosure 100. Analyzer 106 is connected to fibre channel connection 104 to obtain data being transferred between these two devices for use in debugging problems manifesting themselves in communications between controller enclosure 100 and disk enclosure 102. In this simple example, obtaining data for analysis is straightforward and easy to set up.

In other cases, such an analysis is more difficult to perform. It is common for multiple devices to communicate with each other and be located in the same physical box or enclosure. For example, in FIG. 2, a diagram illustrating a known storage subsystem is illustrated. Controller enclosure 200 is connected to disk enclosure 202 by fibre channel connection 204. In this example, controller enclosure 200 contains two controllers, controller 206 and controller 208. These two controllers may initiate commands to disk enclosure 202 as well as send commands to each other. Analyzer 210 may be attached to fibre channel connection 204, which allows gathering data on traffic sent between controllers 206 and 208 and disk enclosure 202. In this case, however, data or traffic sent between controller 206 and controller 208 cannot be obtained by analyzer 210 because no physical attachment is present to connect analyzer 210 to link 212, which exists internally within controller enclosure 200. In this situation, trace logs recorded by each of the controllers may be examined. This solution, however, requires gathering large amounts of data, which is often memory intensive. Further, no guarantee is present that any level of logging will provide sufficient detail to solve the problem. This situation is especially true when a hardware device, such as a protocol chip, is faulty and causes a bug. As a result, debugging is often an iterative and time-consuming process.

Therefore, it would be advantageous to have an improved method, apparatus, and computer instructions for analyzing and debugging problems in a storage subsystem.

SUMMARY OF THE INVENTION

The present invention provides a method, apparatus, and computer instructions for a storage subsystem. This subsystem includes controller devices, storage devices, and a communications network. The communications network connects the controller devices and the storage devices. The communications network also includes a set of diagnostic outputs. The set of diagnostic outputs is configured to output data sent between two devices from the controller devices and the storage devices for monitoring.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 1 is a diagram of a known controller/storage device system employing fibre channel;

FIG. 2 is a diagram illustrating a known storage subsystem;

FIG. 3 is a diagram illustrating a storage subsystem in accordance with a preferred embodiment of the present invention;

FIG. 4 is a diagram illustrating a communications network using a loop topology in accordance with a preferred embodiment of the present invention;

FIG. 5 is a diagram illustrating a communications network using a switched network topology in accordance with a preferred embodiment of the present invention; and FIG. 6 is a flowchart of a process used for gathering and analyzing data in accordance with a preferred embodiment of the present invention.

DETAILED DESCRIPTION

With reference now to the figures and in particular with reference to FIG. 3, a diagram illustrating a storage subsystem is depicted in accordance with a preferred embodiment of the present invention. In this example, storage subsystem 300 includes controller 302 and controller 304, which are used to control disk 306, disk 308, and disk 310. These devices are all connected through communications network 312. This communications network may take various forms, such as, for example, an arbitrated loop or a switched network. Storage subsystem 300 is implemented using fibre channel connections. The connections to devices are through device ports. In these examples, one device port is for receiving traffic or data, while the other device port is for transmitting traffic or data. Controller 302 is connected to communications network 312 through connections 314 and 316. Controller 304 is connected to communications network 312 through connections 318 and 320. Disk 306 is connected to communications network 312 through connections 322 and 324; disk 308 is connected to communications network 312 through connections 326 and 328; and disk 310 is connected to communications network 312 through connections 330 and 332.

Communications network 312 also includes diagnostic ports 334 and 336, which provide a port to connect analyzer 338 to storage subsystem 300 to gather data for debugging and diagnostic purposes. Diagnostic port 334 is used to output source data, while diagnostic port 336 is used to output destination data in this illustration. As shown, these diagnostic ports are configured to allow the gathering of data sent between controller 302 and disk 310. Controller 302 acts as an initiator with disk 310 being the target in this example. These diagnostic ports are not static, but may be configurable to provide for the gathering of data or traffic sent between any of the devices connected by communications network 312. For example, the same diagnostic ports, diagnostic port 334 and diagnostic port 336, may be configured to output data sent between other devices, such as controller 302 and controller 304.

Through this type of architecture in which a switching structure connects all of the devices to each other, a single set of diagnostic ports or output ports may be used to gather data between any combination of devices in the subsystem. This architecture allows transmissions or data between any initiator and any target to gather adequate data in monitoring system traffic. As a result, diagnostic port 334 and diagnostic port 336 may be a data outlet for any device connected to communications network 312. This flexibility allows for analysis of traffic between all devices without requiring a separate port for each transmission line as currently required in presently used architectures, such as the system illustrated in FIG. 2.

Turning now to FIG. 4, a diagram illustrating a communications network using a loop topology is depicted in accordance with a preferred embodiment of the present invention. Communications network 400 uses a loop network topology. Communications network 400 is an example of a particular implementation of communications network 312 in FIG. 3. Traffic between different devices is controlled through the use of multiplexers 402, 404, 406, and 408. These multiplexers are configured in a serial loop configuration. In these examples, each multiplexer contains two inputs and one output. The output of multiplexer 402 is connected to the input of multiplexer 404, the output of multiplexer 404 is connected to the input of multiplexer 406, and the output of multiplexer 406 is connected to the input of multiplexer 408. The output of multiplexer 408 loops back and is connected to the input of multiplexer 402 to form the loop configuration. The other input of each multiplexer is connected to a device port in a device, such as, for example, controller 302 or disk 306 in FIG. 3. Further, the output of each multiplexer is connected to a device port. The input selected to be output through the output of a multiplexer is selected through a bypass control signal.

In addition, communications network 400 also includes multiplexer 410 and multiplexer 412. The output of these multiplexers form a pair of diagnostic ports, such as diagnostic port 334 and 336 in FIG. 3. The inputs of each of these diagnostic ports is connected to an output of each of the multiplexers. The input selected for output to a diagnostic port is selected through a diagnostic port selection signal. Through these selection signals, the traffic from any combination of devices connected to communications network 400 may be output to diagnostic ports for analysis. This architecture does not require a port or output for each path or connection between different devices within the subsystem.

With reference now to FIG. 5, a diagram illustrating a communications network using a switched network topology is depicted in accordance with a preferred embodiment of the present invention. Communications network 500 is an example of a particular implementation of communications network 312 in FIG. 3. Communications network 500 contains switching units 502, 504, 506, and 508. Each of these switching units is connected to a set of device ports in the communications network. Each switching unit contains a set of input buffers and a set of output buffers. As illustrated, switching unit 502 contains input buffers 510 and output buffers 512, switching unit 504 contains input buffers 514 and output buffers 516; switching unit 506 contains input buffers 518 and output buffers 520; and switching unit 508 contains input buffers 522 and output buffers 524. The input buffers are connected to the set of device ports and converge to a single output for connection to a device port. The output buffers are connected to the set of device ports with the inputs to these buffers being connected to a single device port. A control mechanism is used to select a particular buffer for output or input. In this example, four device ports are present. The particular device ports selected are controlled by a route control signal.

Communications network 500 also includes multiplexer 526 and multiplexer 528, which provide an output for connection to a diagnostic port, such as diagnostic port 334 and 336 in FIG. 3. The inputs of multiplexer 526 are connected to the input having a path through the output buffers, while multiplexer 528 has its inputs connected to the inputs for the input buffers in each switching unit. The particular input selected for output through a multiplexer is controlled through a diagnostic port selection signal. In this manner, communications network 500 may provide an ability to output data for diagnostic and debugging uses through a single set of diagnostic ports. Having a diagnostic port for each possible path or route between different devices is avoided through this configurable diagnostic port mechanism implemented within communications network 500.

With reference now to FIG. 6, a flowchart of a process used for gathering and analyzing data is depicted in accordance with a preferred embodiment of the present invention. The process illustrated in FIG. 6 may be implemented in a storage subsystem, such as storage subsystem 300 in FIG. 3. In particular, these steps may be implemented in the form of computer instructions or firmware to generate the appropriate control signals for configured outputs for a set of diagnostic ports, such as diagnostic port 334 and diagnostic port 336 in FIG. 3.

The process begins by receiving the first device selection (step 600). A second device selection is received (step 602). These device selections may be for any initiator and target in a storage subsystem. A path is configured between the device for testing (step 604). This path may be configured by sending or generating the control signals for the communications network to select or connect the devices to each other in a path through the communications network. Diagnostic ports are configured to monitor activity between the first device and the second device (step 606). The configuration is achieved through sending or generating the appropriate diagnostic port selection signals such that the output in the diagnostic ports corresponds to the path between the selected devices. A test is executed (step 608). This test includes gathering data sent between the selected devices and analyzing the data. An example of an analyzer, which may be used to obtain and analyze data is a Finisar GTX Fibre Channel Analyzer, which is available from Finisar Corporation.

Thus, the present invention provides an improved method, apparatus, and computer instructions for monitoring the transfer of data between different devices. Specifically, commands sent between devices may be gathered for diagnostic and debugging purposes. The mechanism of the present invention avoids having to require a separate port for every path or transmission between different devices in a storage subsystem. A communications network implementing a configurable port system is included in the storage subsystem to interconnect the different devices. Thus, each time a particular initiator and target is selected for monitoring, the ports may be configured to output data sent between those two devices.

The description of the preferred embodiment of the present invention has been presented for purposes of illustration and description, but is not intended to be exhaustive or limited to the invention in the form disclosed. Many modifications and variations will be apparent to those of ordinary skill in the art. For example, the subsystems illustrated are storage subsystems. Of course, the mechanism of the present invention may be applied to other types of subsystems other than storage subsystems. The mechanism of the present invention may be incorporated into any node based network protocol, including, for example, computer motherboard architectures such as Infiniband or PCI Express to provide a diagnostic analyzer access to the bus. The embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for obtaining data from a storage system including a plurality of controller devices, a plurality of devices controlled by the plurality of controller devices, and a communications network connecting the plurality of controller devices and the plurality of devices in which the communications network includes a configurable set of data outputs, the method comprising:
identifying a controller device from the plurality of controller devices and a device from the plurality of devices controlled by the plurality of controller devices to form a selected controller device and a selected device; and
sending a message to the communications network to configure the configurable set of data outputs to output data transferred between the selected controller device and the selected device, in which configuring the configurable set of data outputs includes causing a plurality of routing elements between the plurality of devices and plurality of controller devices to selectively route signals to the configurable set of data outputs.

2. The method of claim 1, wherein the communications network has a loop network topology.

3. The method of claim 1, wherein the communications network has a switched network topology.

4. The method of claim 1, wherein the plurality of devices is a plurality of storage devices.

5. The method of claim 1, wherein the data outputs are used for diagnostic testing of the selected controller device and the selected device.

6. The method of claim 1, wherein the configurable set of data outputs is a pair of data outputs coupled to an external data analyzer to externally monitor the data transferred between the selected controller device and the selected device.

7. The method of claim 1 further comprising:
obtaining data from the configurable set of data outputs after the configurable set of data outputs have been configured to output data between the selected controller device and the selected device; and
performing diagnostic tests using the data.

8. The method of claim 1 further comprising:
identifying a first controller device from the plurality of controller devices and a second controller device from the plurality of controller devices to form a first selected controller device and a second selected controller device; and
sending a message to the communications network to configure the configurable set of data outputs to output data transferred between the first selected controller device and the second selected controller device.

9. A data processing system for obtaining data from a storage system, the data processing system comprising:
the storage system including a plurality of controller devices, a plurality of devices controlled by the plurality of controller devices, and a communications network connecting the plurality of controller devices and the plurality of devices in which the communications network includes a configurable set of data outputs;
identifying means for identifying a controller device from the plurality of controller devices and a device from the plurality of devices controlled by the plurality of controller devices to form a selected controller device and a selected device; and
sending means for sending a message to the communications network to configure the configurable set of data outputs to output data transferred between the selected controller device and the selected device, in which configuring the configurable set of data outputs includes causing a plurality of routing elements between the plurality of devices and plurality of controller devices to selectively route signals to the configurable set of data outputs.

10. The data processing system of claim 9, wherein the communications network has a loop network topology.

11. The data processing system of claim 9, wherein the communications network has a switched network topology.

12. The data processing system of claim 9, wherein the plurality of devices is a plurality of storage devices.

13. The data processing system of claim 9, wherein the data outputs are used for diagnostic testing of the selected controller device and the selected device.

14. The data processing system of claim 9, wherein the configurable set of data outputs is a pair of data outputs coupled to an external data analyzer to externally monitor the data transferred between the selected controller device and the selected device.

15. The data processing system of claim 9 further comprising:
obtaining means for obtaining data from the configurable set of data outputs after the configurable set of data outputs have been configured to output data between the selected controller device and the selected device; and
performing means for performing diagnostic tests using the data.

16. The data processing system of claim 9, wherein the identifying means is a first identifying means, the sending means is a first sending means, and further comprising:

second identifying means for identifying a first controller device from the plurality of controller devices and a second controller device from the plurality of controller devices to fowl a first selected controller device and a second selected controller device; and second sending means for sending a message to the communications network to configure the configurable set of data outputs to output data transferred between the first selected controller device and the second selected controller device.

17. A computer program product in a computer readable medium for obtaining data from a storage system including a plurality of controller devices, a plurality of devices controlled by the plurality of controller devices, and a communications network connecting the plurality of controller devices and the plurality of devices in which the communications network includes a configurable set of data outputs, the computer program product comprising:

first instructions for identifying a controller device from the plurality of controller devices and a device from the plurality of devices controlled by the plurality of controller devices to form a selected controller device and a selected device; and second instructions for sending a message to the communications network to configure the configurable set of data outputs to output data transferred between the selected controller device and the selected device, in which configuring the configurable set of data outputs includes causing a plurality of routing elements between the plurality of devices and plurality of controller devices to selectively route signals to the configurable set of data outputs.

* * * * *